United States Patent
Watekar et al.

(10) Patent No.: US 10,955,612 B2
(45) Date of Patent: Mar. 23, 2021

(54) STRESS-MANAGED SPECIALTY FIBER FOR SENSORY APPLICATION

(71) Applicant: Sterlite Technologies Limited, Aurangabad (IN)

(72) Inventors: Pramod Watekar, Maharashtra (IN); Annesha Maity, Maharashtra (IN); Manoj Mittal, Maharashtra (IN); Sandeep Gaikwad, Maharashtra (IN); Sham Nagarkar, Maharashtra (IN); Bhalchandra Pathak, Maharashtra (IN); Sathis Ram, Maharashtra (IN)

(73) Assignee: Sterlite Technologies Limited, Auranbabad (IN)

( * ) Notice: Subject to any disclaimer, the term of this patent is extended or adjusted under 35 U.S.C. 154(b) by 0 days.

(21) Appl. No.: 16/286,517

(22) Filed: Feb. 26, 2019

(65) Prior Publication Data
US 2020/0209469 A1 Jul. 2, 2020

(30) Foreign Application Priority Data
Dec. 31, 2018 (IN) .............................. 201821050050

(51) Int. Cl.
*G02B 6/00* (2006.01)
*G02B 6/036* (2006.01)
*G01D 5/353* (2006.01)

(52) U.S. Cl.
CPC ....... *G02B 6/03694* (2013.01); *G01D 5/3537* (2013.01)

(58) Field of Classification Search
CPC ...... G02B 6/022; G02B 6/00; G02B 6/03694; G01D 5/3537
See application file for complete search history.

(56) References Cited

U.S. PATENT DOCUMENTS 6,568,220 B1 * 5/2003 Paek .................. G02B 6/02095
65/392
9,031,371 B2 * 5/2015 Yonezawa ............ G02B 6/0281
385/124

* cited by examiner

*Primary Examiner* — Jennifer Doan

(57) ABSTRACT

Embodiments describe an optical fiber that includes a core. The core has high compressive stress. The compressive stress of the core is in a range of about 20 to 60 MPa. The optical fiber further includes a cladding. The cladding is divided into a first cladding layer and a second cladding layer. The second cladding layer has a high residual stress. The high residual stress of the second cladding layer is in a range of about 20 to 60 MPa. The optical fiber enables reduction of particle related breaks. Further, the optical fiber has elevated LLT strength. The LLT strength is about 6 Kg. The optical fiber has high proof test yield. Furthermore, the optical fiber is highly sensitive to micro-bending of the optical fiber.

18 Claims, 2 Drawing Sheets

STRESS-MANAGED SPECIALTY FIBER FOR SENSORY APPLICATION

BACKGROUND

Field of the Invention

The present disclosure relates to a field of optical fiber. More particularly, the present disclosure relates to stress-managed optical fiber for sensory applications. The present application is based on, and claims priority from an Indian Application Number 201821050050 filed on 31 Dec. 2018 the disclosure of which is hereby incorporated by reference.

Description of the Related Art

Optical fiber communication has revolutionized the telecommunication industry in the past few years. Optical fibers are used for a variety of applications. One of the applications for which the optical fibers have a widely popular use is sensing applications. The sensing applications include architectural and structural monitoring, temperature and pressure measurements, intrusion detection and the like. The sensing can be done at discrete points in a distributed fashion. Typically, standard single mode and multimode optical fibers are used for sensing application. In addition, double core optical fibers are used for sensing applications. Currently, micro-bending loss based sensors use single mode optical fibers. Micro-bending loss induces attenuation in the optical fibers. In addition, micro-bending induces mode coupling, causing light to couple from a propagating mode to a radiation or cladding mode. However, the single mode optical fibers are less sensitive to pressure, weight and the like. Specialty fibers are often required in order to meet requirements for specific applications. However, these specialty fibers have complex designs and are difficult to manufacture.

BRIEF SUMMARY OF THE INVENTION

The present disclosure provides an optical fiber for sensory applications. The optical fiber includes a core. The core has high compressive stress. The high compressive stress of the core is in the range of about 20 to 60 MPa. The optical fiber includes a cladding. The cladding is divided into a first cladding layer and a second cladding layer. The second cladding layer has high residual stress. The residual stress of the second cladding layer is in a range of about 20 to 60 MPa. The optical fiber is highly sensitive to micro-bending of the optical fiber.

A primary object of the present disclosure is to provide an optical fiber for sensory applications.

Another object of the present disclosure is to provide the optical fiber having high sensitivity to micro-bending.

Yet another object of the present disclosure is to provide the optical fiber that enables reduction of particle related breaks.

Yet another object of the present disclosure is to provide stress managed optical fiber that can be easily manufactured.

Yet another object of the present disclosure is to provide a single core optical fiber with modified residual stress.

Yet another object of the present disclosure is to provide the optical fiber having high LLT strength.

In an embodiment of the present disclosure, the optical fiber is highly sensitive to micro-bending of the optical fiber.

In an embodiment of the present disclosure, the cladding includes a first cladding layer and a second cladding layer. The first cladding layer is an inner cladding layer and the second cladding layer is an outer cladding layer. The first cladding layer and the second cladding layer is made of silica.

In an embodiment of the present disclosure, the cladding includes a first cladding layer and a second cladding layer. The first cladding layer has low residual stress.

In an embodiment of the present disclosure, the cladding includes a first cladding layer and a second cladding layer. The second cladding layer has high residual stress. The high residual stress of the second cladding layer facilitates high compressive stress of the core. The high residual stress of the second cladding layer causes enhanced geometrical deformations at a boundary of the core and the first cladding layer and at a boundary of the first cladding layer and the second cladding layer.

In an embodiment of the present disclosure, the cladding includes the first cladding layer and the second cladding layer. The second cladding layer of the optical fiber is highly sensitive to residual stress causing the attenuation of about 0.35 dB/km at 1310 nm. Typical increase in the micro-bending loss is about 0.15 to 0.25 decibels at 1310 nm by adopting 4 cm of bending diameter of a loop and the standard sandpaper micro-bending test method (IEC 62221).

In an embodiment of the present disclosure, the cladding includes the first cladding layer and the second cladding layer. The second cladding layer of the optical fiber is sensitive to residual stress causing the attenuation at a value of about 0.33 decibels per kilometer at 1310 nanometer.

In an embodiment of the present disclosure, the optical fiber enables reduction of particle related breaks. In addition, the optical fiber has elevated LLT strength. The LLT strength is about 6 Kg. Further, the optical fiber has high proof test yield.

In an embodiment of the present disclosure, the first cladding layer has low residual stress.

In an embodiment of the present disclosure, the high residual stress of the second cladding layer facilitates high compressive stress of the core. Also, high residual stress of the second cladding layer causes enhanced geometrical deformations at boundary of the core and the first cladding layer and at the boundary of the first cladding layer and the second cladding layer.

In an embodiment of the present disclosure, the second cladding layer of the cladding is sensitive to residual stresses and causes the attenuation at a value of about 0.35 decibels per kilometer at a wavelength of 1310 nm.

In an embodiment of the present disclosure, the second cladding layer of the cladding is sensitive to attenuation at a value of about 0.33 decibels per kilometer at a wavelength of about 1310 nanometer.

DESCRIPTION OF THE DRAWINGS

Figure 1:
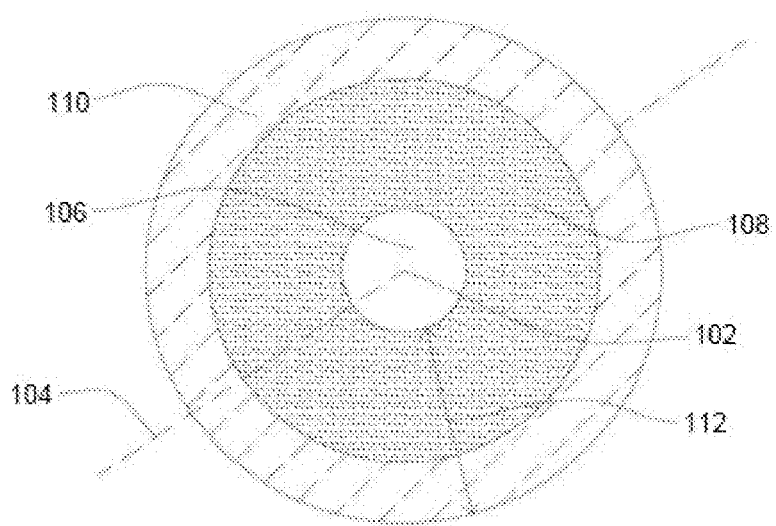
Figure 2:
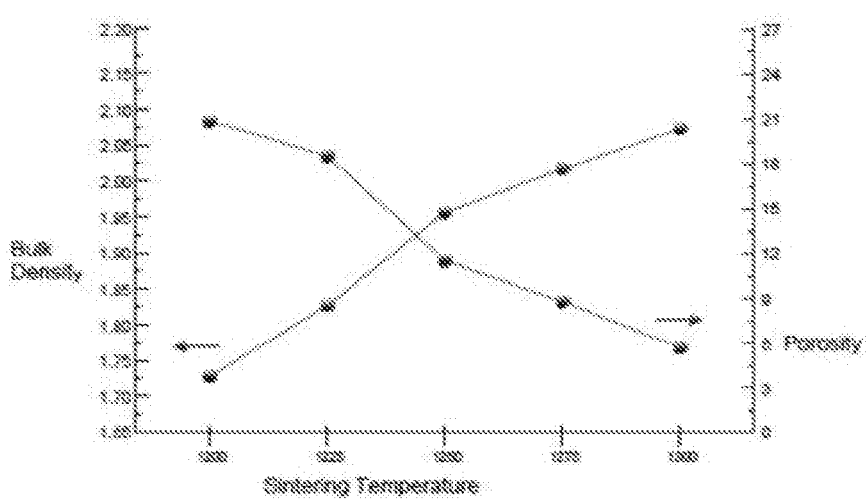

Having thus described the disclosure in general terms, reference will now be made to the accompanying figures, wherein:

FIG. 1 illustrates a cross sectional view of an optical fiber, in accordance with various embodiments of the present disclosure; and FIG. 2 illustrates an example graph showing effect of sintering temperature on bulk density and porosity of cladding, in accordance with an embodiment of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

REFERENCE NUMERALS IN THE DRAWINGS

For a more complete understanding of the present invention parts, reference is now made to the following descriptions:
100. Optical fiber.
102. Geometrical center.
104. longitudinal axis.
106. Core.
108. The first cladding layer.
110. The second cladding layer.
112. The cladding.
200. An example graph.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

FIG. 1 illustrates a cross-sectional view of an optical fiber 100, in accordance with various embodiments of the present disclosure. In general, the optical fiber 100 is a thin flexible fiber that is used for transmission of information as light pulses. In addition, the optical fiber 100 is used as a medium that carry light from one end to other end. In general, the optical fiber 100 is used in telecommunications to transmit telephone signals, internet communication, cable television signals and the like. The optical fiber 100 is used for sensory applications. In an embodiment of the present disclosure, the optical fiber 100 is used to sense one or more parameters. The one or more parameters include temperature, pressure, weight, stress, vibrations, displacements, rotations, microbending and the like.

The optical fiber 100 is defined along a longitudinal axis 104 passing through a geometrical center 102 of the optical fiber 100. In general, the longitudinal axis 104 of the optical fiber 100 is an axis along lengthwise direction of the optical fiber 100. The longitudinal axis 104 passes through the geometrical center 102. In general, geometrical center 102 of the optical fiber 100 is central point of the optical fiber 100. In other words, the geometrical center 102 of the optical fiber 100 is defined as midpoint of the diameter of the optical fiber 100. The optical fiber 100 is circular in shape. In an embodiment of the present disclosure, the optical fiber 100 may be of any shape.

The optical fiber 100 includes a core 106 and a cladding 112. The center of the core 106 of the optical fiber 100 and the geometrical center 102 of the optical fiber 100 coincide with each other. In general, the core 106 is an innermost portion of the optical fiber 100 that facilitates propagation of light. In an embodiment of the present disclosure, the core 106 is characterized by a diameter. The diameter of the core 106 is in a range of about 6-10 micrometers.

The optical fiber 100 includes the cladding 112. The cladding 112 surrounds the core 106. In general, the cladding 112 has a lower refractive index than the core 106. The lower refractive index of the cladding 112 enables total internal reflection of light waves in the core 106 and propagation of light waves within the core 106. In general, total internal reflection is a phenomenon that occurs when a propagated wave strikes a medium boundary at an angle larger than particular critical angle. The cladding 112 is divided into a first cladding layer 108 and a second cladding layer 110. The first cladding layer 108 is an inner cladding layer and the second cladding layer 110 is an outer cladding layer of the optical fiber 100. The first cladding layer 108 is made of silica. In addition, the first cladding layer 108 is characterized by residual stress. In general, residual stress is a stress that remains in a solid material after original cause of the stress is removed. In other words, residual stress is a stress that would still exist in a body if all external loads are removed. The first cladding layer 108 has low residual stress.

In an embodiment of the present disclosure, residual stress of the first cladding layer 108 is in a range of about 1-15 MPa. In addition, the first cladding layer 108 is characterized by a thickness. The thickness of the first cladding layer 108 is in a range of about 25-45 micrometers. The second cladding layer 110 surrounds the first cladding layer 108. The second cladding layer 110 is made of silica. The second cladding layer 110 has high residual stress. In an embodiment of the present disclosure, residual stress of the second cladding layer 110 facilitates high compressive stress of the core 106. In general, compressive stress is a force that causes a material to deform to occupy a smaller volume. The material is under compression if the material is experiencing compressive stress. In an embodiment of the present disclosure, compressive stress of the core 106 is in a range of about 20 to 60 MPa. The second cladding layer 110 facilitates enhanced geometrical deformations at a boundary of the core 106 and the first cladding layer 108 and at a boundary of the first cladding layer 108 and the second cladding layer 110 due to residual stress of the second cladding layer 110. In general, geometrical deformation refers to change in shape of a body caused by an application of a force or stress. In an embodiment of the present disclosure, residual stress of the second cladding layer 110 is in a range of about 20 to 60 MPa. The optical fiber 100 senses geometrical deformations at the boundary of the core 106 and the second cladding layer 110 and sends signal to control stations of the optical fiber 100. Further, the second cladding layer 110 is characterized by a thickness. The thickness of the second cladding layer 110 is in a range of about 10-20 micrometers.

FIG. 2 illustrates an example graph 200 showing effect of sintering temperature on bulk density of the second cladding layer 110 and porosity of the second cladding layer 110, in accordance with an embodiment of the present disclosure.

In an embodiment of the present disclosure, increase in temperature of the second cladding layer 110 causes increase in density of the second cladding layer 110. In other words, the density of the second cladding layer 110 is directly proportional to the temperature of the second cladding layer 110. In an example, as shown in FIG. 2, at sintering temperature of about 1200° C., bulk density of the second cladding layer 110 is in a range of about 1.70 gram per centimeter3 to 1.75 gram per centimeter3. In general, bulk density and density is same in case of fibers. At sintering temperature of about 1225° C., the bulk density of the second cladding layer 110 is about 1.80 gram per centimeter3. At sintering temperature of about 1250° C., the bulk density of the second cladding layer 110 is about 1.95 gram per centimeter3. At sintering temperature of about 1275° C., the bulk density of the second cladding layer 110 is about 2.0 gram per centimeter3. At sintering temperature of about 1300° C., the bulk density of the second cladding layer 110 is in a range of about 2.5 gram per centimeter3 to 2.10 gram per centimeter3. The increased bulk density of the second cladding layer 110 causes the high residual stress in the second cladding layer. Further, residual stress in the second cladding layer 110 facilitates the high compressive stress in the core 106 of the optical fiber 100 without increasing concentration of germanium dioxide (GeO) in the core 1062 of the optical fiber 100. In the above example, increase in sintering temperature of the second cladding layer 110 decreases porosity of the second cladding layer 110. Moreover, porosity of the second cladding layer 110 is decreased with increase in the density of the second cladding layer 110.

In an embodiment of the present disclosure, the second cladding layer 110 of the optical fiber 100 is sensitive to residual stress causing the attenuation of about 0.35 dB/km at a wavelength of 1310 nm. The attenuation value provided above is for the optical fiber 100. In an embodiment of the present disclosure, a typical increase in the micro-bending loss is about 0.15 to 0.25 decibels at 1310 nm by adopting 4 cm of bending diameter of a loop and the standard sandpaper micro-bending test method (IEC 62221). In general, micro-bending is an imperfection in the optical fiber 100 which occurred during manufacturing of the optical fiber 100. In addition, micro-bending loss relates to light signal loss associated with stresses along length of the optical fiber 100. In an embodiment of the present disclosure, the second cladding layer 110 of the optical fiber 100 is highly sensitive to attenuation. In general, attenuation refers to reduction in the strength of a signal. In addition, attenuation is a natural consequence of signal transmission over long distances. The second cladding layer 110 of the optical fiber 100 is sensitive to residual stresses and gives attenuation at a value of about 0.33 decibels per kilometer at a wavelength of about 1310 nanometer. The attenuation value corresponds to attenuation for a standard fiber.

The optical fiber 100 has elevated LLT strength. The LLT strength is about 6 Kg. The LLT strength corresponds to tensile strength of the optical fiber 100. The optical fiber 100 reduces particles related breaks. In addition, the optical fiber 100 has high proof test yield. In general, proof test is a process to ensure minimum strength of the optical fiber 100. The optical fiber 100 is easy to install and is cost effective. Further, the optical fiber 100 can be easily manufactured. A soot preform is inserted into a furnace during manufacturing of the optical fiber 100. In general, preform is a large cylindrical body of glass having a core structure and a cladding structure. In addition, the preform is a material used for fabrication of optical fibers. Accordingly, the optical fibers are used for a number of purposes. The number of purposes includes telecommunications, broadband communications, medical applications, military applications and the like. In general, the preform is a fiber in a large form. The optical fiber 100 is drawn out of the soot preform. The furnace has high temperature in middle region of the furnace. The high temperature in the middle region of the furnace creates high density in the second cladding layer 110 of the optical fiber 100. In addition, the high temperature of the middle region of the furnace creates high residual stress in the second cladding layer 110 of the optical fiber 100.

In an embodiment of the present disclosure, the optical fiber 100 is obtained using at least one manufacturing process. The at least one manufacturing process includes but may not be limited to outside vapor deposition (OVD) process, vapor axial deposition (VAD) process, and modified chemical vapor deposition (MCVD) process.

The optical fiber 100 is characterized by a diameter. In an embodiment of the present disclosure, the optical fiber 100 has diameter in a range of about 124-126 micrometers. In another embodiment of the present disclosure, the optical fiber 100 has diameter in any suitable range.

The optical fiber 100 of the present disclosure offers a number of advantages over the prior arts. The optical fiber 100 has a simple structure with single core. Also, the optical fiber 100 is used for sensory applications to sense one or more parameters. The one or more parameters include temperature, pressure, weight, stress, vibrations, displacements, rotations, micro-bending and the like.

The foregoing descriptions of specified embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the disclosure have been described above and illustrated in some cases, it should be interpreted and understood as to have been presented only by way of illustration and example, but not by limitation. Thus, the breadth and scope of a preferred embodiment should not be limited by any of the above-described exemplary embodiments.

The above specification provides examples of how certain inventive aspects may be put into practice. It will be appreciated that the inventive aspects can be practiced in other ways than those specifically shown and described herein without departing from the spirit and scope of the inventive aspects of the present disclosure.

What we claim is:
1. An optical fiber for sensory applications comprising:
a core, wherein the core has high compressive stress; and
a cladding, wherein the cladding is characterized by high residual stress.
2. The optical fiber as claimed in claim 1, wherein the optical fiber is highly sensitive to micro-bending of the optical fiber.

3. The optical fiber as claimed in claim 1, wherein the cladding comprises a first cladding layer and a second cladding layer, wherein the first cladding layer is an inner cladding layer and the second cladding layer is an outer cladding layer, wherein the first cladding layer and the second cladding layer is made of silica.

4. The optical fiber as claimed in claim 1, wherein the cladding comprises a first cladding layer and a second cladding layer, wherein the first cladding layer of the cladding has low residual stress.

5. The optical fiber as claimed in claim 1, wherein the cladding comprises a first cladding layer and a second cladding layer, wherein the second cladding layer has high residual stress, wherein residual stress of the second cladding layer facilitates high compressive stress of the core, wherein residual stress of the second cladding layer causes enhanced geometrical deformations at a boundary of the core and the first cladding layer and at a boundary of the first cladding layer and the second cladding layer.

6. The optical fiber as claimed in claim 1, wherein the cladding comprises a first cladding layer and a second cladding layer, wherein the second cladding layer of the cladding is highly sensitive to residual stress causing attenuation of about 0.35 dB/km at a wavelength of about 1310 nm.

7. The optical fiber as claimed in claim 1, wherein the cladding comprises a first cladding layer and a second cladding layer, wherein the second cladding layer of the cladding is sensitive to residual stress causing the attenuation at a value of about 0.33 decibels per kilometer at a wavelength of 1310 nanometers.

8. The optical fiber as claimed in claim 1, wherein the optical fiber enables reduction of particle related breaks, wherein the optical fiber has elevated LLT strength, wherein the LLT strength is about 6 Kg, wherein the optical fiber has high proof test yield.

9. An optical fiber for sensory applications comprising:
a core, wherein the core has high compressive stress; and
a cladding, wherein the cladding comprises a first cladding layer and a second cladding layer, wherein the second cladding layer has high residual stress,
wherein the optical fiber is highly sensitive to micro-bending of the optical fiber.

10. The optical fiber as claimed in claim 9, wherein the first cladding layer has low residual stress.

11. The optical fiber as claimed in claim 9, wherein residual stress of the second cladding layer facilitates high compressive stress of the core, wherein residual stress of the second cladding layer causes enhanced geometrical deformations at a boundary of the core and the first cladding layer and at a boundary of the first cladding layer and the second cladding layer.

12. The optical fiber as claimed in claim 9, wherein the second cladding layer of the cladding is highly sensitive to residual stress causing attenuation of about 0.35 dB/km at a wavelength of about 1310 nm.

13. The optical fiber as claimed in claim 9, wherein the second cladding layer of the cladding is sensitive to residual stress causing the attenuation at a value of about 0.33 decibels per kilometer at a wavelength of 1310 nanometers.

14. The optical fiber as claimed in claim 9, wherein the optical fiber enables reduction of particle related breaks, wherein the optical fiber has elevated LLT strength, wherein the LLT strength is about 6 Kg, wherein the optical fiber has high proof test yield.

15. An optical fiber for sensory applications comprising:
a core, wherein the core has high compressive stress, wherein compressive stress of the core is in a range of about 20-60 MPa; and
a cladding, wherein the cladding comprises a first cladding layer and a second cladding layer, wherein the second cladding layer has high residual stress, wherein residual stress of the second cladding layer is in a range of about 20 to 60 MPa,
wherein the optical fiber is highly sensitive to micro-bending of the optical fiber.

16. The optical fiber as claimed in claim 15, wherein the second cladding layer of the optical fiber is sensitive to micro-bending loss at a value of about 0.35 decibels per kilometer.

17. The optical fiber as claimed in claim 15, wherein the second cladding layer of the cladding is sensitive to attenuation at a value of about 0.33 decibels per kilometer at a wavelength of about 1310 nanometer.

18. The optical fiber as claimed in claim 15, wherein the optical fiber enables reduction of particle related breaks, wherein the optical fiber has elevated LLT strength, the LLT strength is about 6 Kg wherein the optical fiber has high proof test yield.

* * * * *